United States Patent
Yu (10) Patent No.: US 9,634,738 B2
(45) Date of Patent: Apr. 25, 2017

(54) HYBRID POWER LINE/WIRELESS APPLIANCE AUTOMATION SYSTEM, DEVICE, AND POWER MONITORING METHOD UTILIZING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wei-Lun Yu, Hsinchu (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 725 days.

(21) Appl. No.: 14/093,453

(22) Filed: Nov. 30, 2013

(65) Prior Publication Data
US 2014/0177692 A1    Jun. 26, 2014

(30) Foreign Application Priority Data
Dec. 21, 2012    (TW) .............................. 101148963 A (51) Int. Cl.
| | |
|---|---|
| H02J 1/00 | (2006.01) |
| H04B 7/00 | (2006.01) |
| H04B 3/46 | (2015.01) |
| H04B 3/54 | (2006.01) |

(52) U.S. Cl.
CPC ................ *H04B 7/00* (2013.01); *H04B 3/46* (2013.01); *H04B 3/542* (2013.01); *H04B 2203/5458* (2013.01); *H04B 2203/5495* (2013.01)

(58) Field of Classification Search
CPC . H04B 7/00; H04B 3/46; H04B 3/542; H04B 2203/5458; H04B 2203/5495
See application file for complete search history.

(56) References Cited

U.S. PATENT DOCUMENTS

2012/0173905 A1*    7/2012    Diab ....................... H04L 12/66
                                                                              713/320

* cited by examiner

*Primary Examiner* — Daniel Cavallari
(74) *Attorney, Agent, or Firm* — Li & Cai Intellectual Property (USA) Office (57) ABSTRACT

The present invention discloses a hybrid power line/wireless appliance automation system for interfacing between at least one electric power distribution circuit and at least one electronic device, a power line communication device, and a power monitoring method using the same. Each power line communication device can be communicatively interconnected via power line communication and/or wireless communication. A threshold value of each power line communication device is dynamically adjusted by a host device via wired or wireless connection, so as to determine whether to continuously supply or turn off power to an electronic device coupled to the power line communication device. The present invention may be implemented/integrated to existing household electric power network without the need for additional physical data network infrastructure/lines, therefore is suitable to be applied in an intelligent home management system.

19 Claims, 7 Drawing Sheets

HYBRID POWER LINE/WIRELESS APPLIANCE AUTOMATION SYSTEM, DEVICE, AND POWER MONITORING METHOD UTILIZING THE SAME

BACKGROUND OF THE INVENTION

1. Field of the Invention

The present invention relates generally to an appliance automation system, device, and power monitoring method utilizing the same, and pertains particularly to a hybrid power line/wireless appliance automation system capable of not only providing wide data transmission/communication coverage within/across isolated electric power distribution circuits but also enabling appliance automation/control and power monitoring functions.

2. Description of Related Art

The concept of utilizing home automation/management systems to integrate and monitor household electronic devices has become increasingly appealing. With this in mind, modern buildings are often designed/constructed with built-in features that are specifically incorporated to accommodate current (or even future) computer networking infrastructures.

However, buildings of older generation often do not support such capability. Particularly, if a household network is to be installed in these old buildings, physical network lines or wireless networks are generally adopted as means for connectivity. Nevertheless, the installation of physical network lines in these old buildings is almost always an effort-taking engineering feast, not to mention the often fragile original structural outlines thereof may be irreversibly damaged. On the other hand, even if wireless network is adopted in the attempt to preserve the original structural outline of the architecture, communication dead zone existed between wireless coverage is often difficult to remove, thus increasing the difficulty in implementing home automation/management system therein.

In addition, electric power distribution circuits of the old buildings are either embedded in walls or nailed on the walls. It is not easy for a common user to note whether the electric power distribution circuits are too old and the quality of distribution lines, thus a safety problem of using a household electronic device is easy to happen.

SUMMARY OF THE INVENTION

One aspect of the present invention provides a hybrid power line/wireless appliance automation system that is capable of enabling data transmission within the same electric power distribution circuit, and/or between two or more physically isolated/independent electric power distribution circuits through selective employment of power line communication (PLC) and wireless communication methods. The hybrid power line/wireless appliance automation system comprises a host device and a plurality of power line communication devices. The plurality of power line communication devices are distributed in one or more electric power distribution circuit, each of them being adapted as an interface between the electric power distribution circuit and a variety of electronic appliances. The power line communication device is provided with a monitoring module and a power management module, giving it the ability to monitor the self-performance and the operational parameters of the electronic appliances coupled thereto, as well as enabling it to selectively supply power to the electronic appliance coupled thereto. On the other hand, the host device is configured to receive power line signal and/or wireless signal from the power line communication device, and accordingly adjust the threshold value for each of the power line communication devices dynamically. Thus, the hybrid power line/wireless appliance automation system in accordance to the present invention is capable of not only providing wide coverage of data transmission/network connectivity, thereby effectively reducing/removing connectivity dead zones in residential and/or industrial environment (particularly in older infrastructures where integrated communication/networking hardware are difficult to implement), the instantly disclosed system may also be utilized to monitor the performance/operational status of the corresponding electronic appliances coupled thereto, thereby ensuring operational safety of the electronic devices within the premises of the particular electric power distribution circuit.

Another aspect of the present invention provides a power line communication device capable of interfacing between an electric power distribution circuit and an electronic appliance. The power line communication device comprises a power line communication module capable of inter-conversion between data signal and power line signal adapted to selectively receive and transmit power line signal through an electric power distribution circuit, a wireless communication module capable of inter-conversion between data signal and wireless signal adapted to selectively receive and transmit wireless signal, a monitoring module for detecting at least one operational parameter of the power line communication device, a processing module configured to generate a control signal when the at least one operational parameter of the power line communication device exceeds a threshold value, and a power management module adapted to receive power from the electric power distribution circuit and selectively supply power to the electronic appliance according to the control signal. The power line communication device in accordance with the present invention is capable of operating under a group broadcasting mode, which can save more energy and provide higher efficiency compared with traditional data transmission methods.

Yet another aspect of the present invention provides a power monitoring method utilizing the hybrid power line/ wireless appliance automation system recited above. The power monitoring method in accordance with the present invention may be implemented through the installation of one or more power line communication device in at least one electric power distribution circuit, where at least one power line communication device is signal communicatively coupled to a host device. The power monitoring method includes the steps of detecting at least one operational parameter of the power line communication device, determining whether the at least one parameter exceeds a threshold value. When the at least one operational parameter exceeds the threshold value (which may be an indication of potential dangerous operating condition), a control signal is generated by the processing module of the power line communication device, causing the power line communication device to seize power provision to a particular electronic appliance coupled thereto, thereby ensuring operational safety. Moreover, the host device can perform operational analysis/evaluation and dynamically determine a new and more appropriate threshold value for each of the Power line communication devices in accordance to the change of operational environment.

In order to further the understanding regarding the present invention, the following embodiments are provided along with illustrations to facilitate the disclosure of the present invention. The description is only for illustrating the present invention and not for limiting the scope of the claims.

DETAILED DESCRIPTION OF THE PREFERRED EMBODIMENTS

The aforementioned illustrations and following detailed descriptions are exemplary for the purpose of further explaining the scope of the present invention. Other objects and advantages related to the present invention will be illustrated in the subsequent descriptions and appended drawings.

[An Embodiment of a Hybrid Power Line/Wireless Appliance Automation System]

Figure 1A:
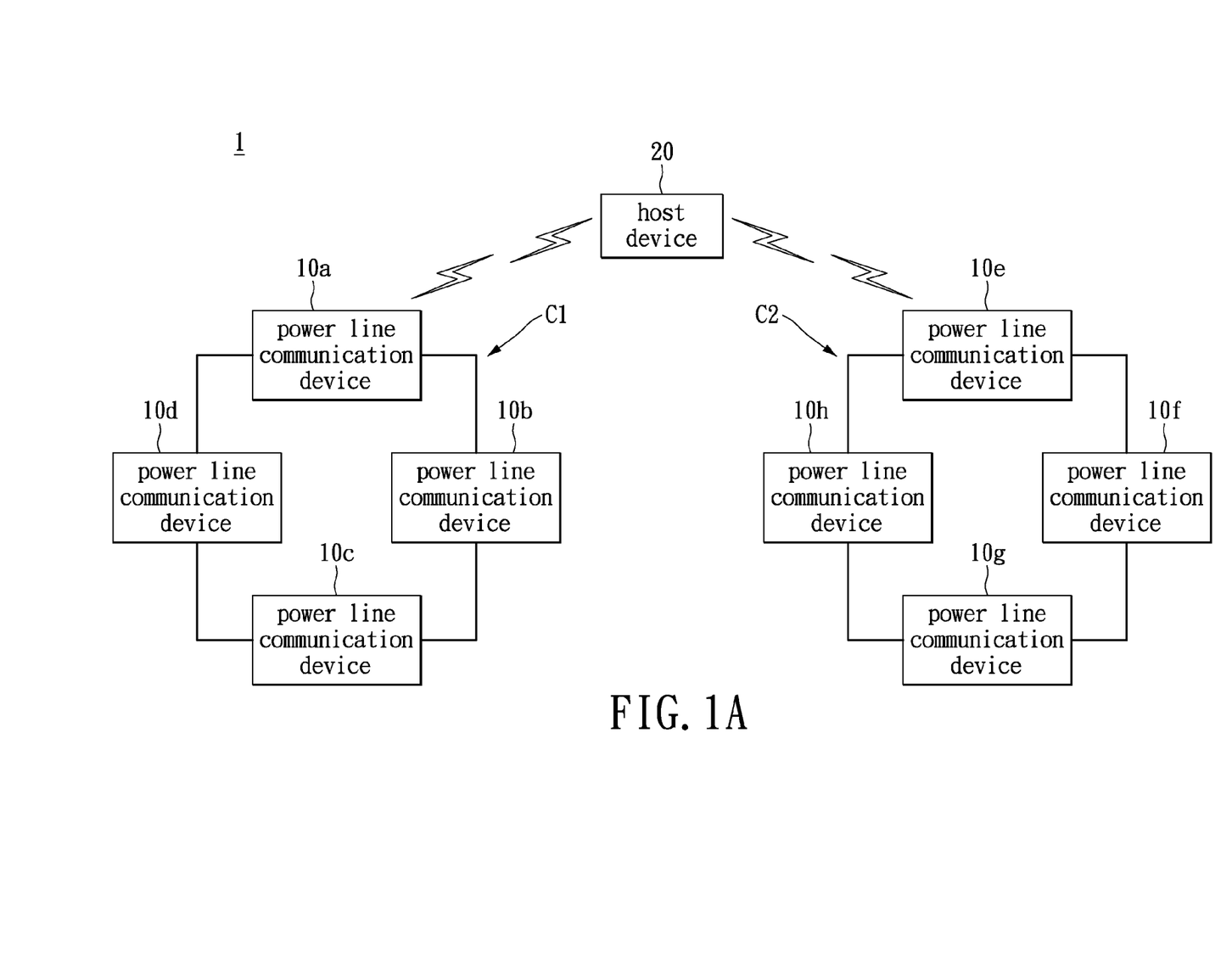
FIG. 1A shows a schematic diagram of a hybrid power line/wireless appliance automation system according to an embodiment of the present invention.
Figure 1B:
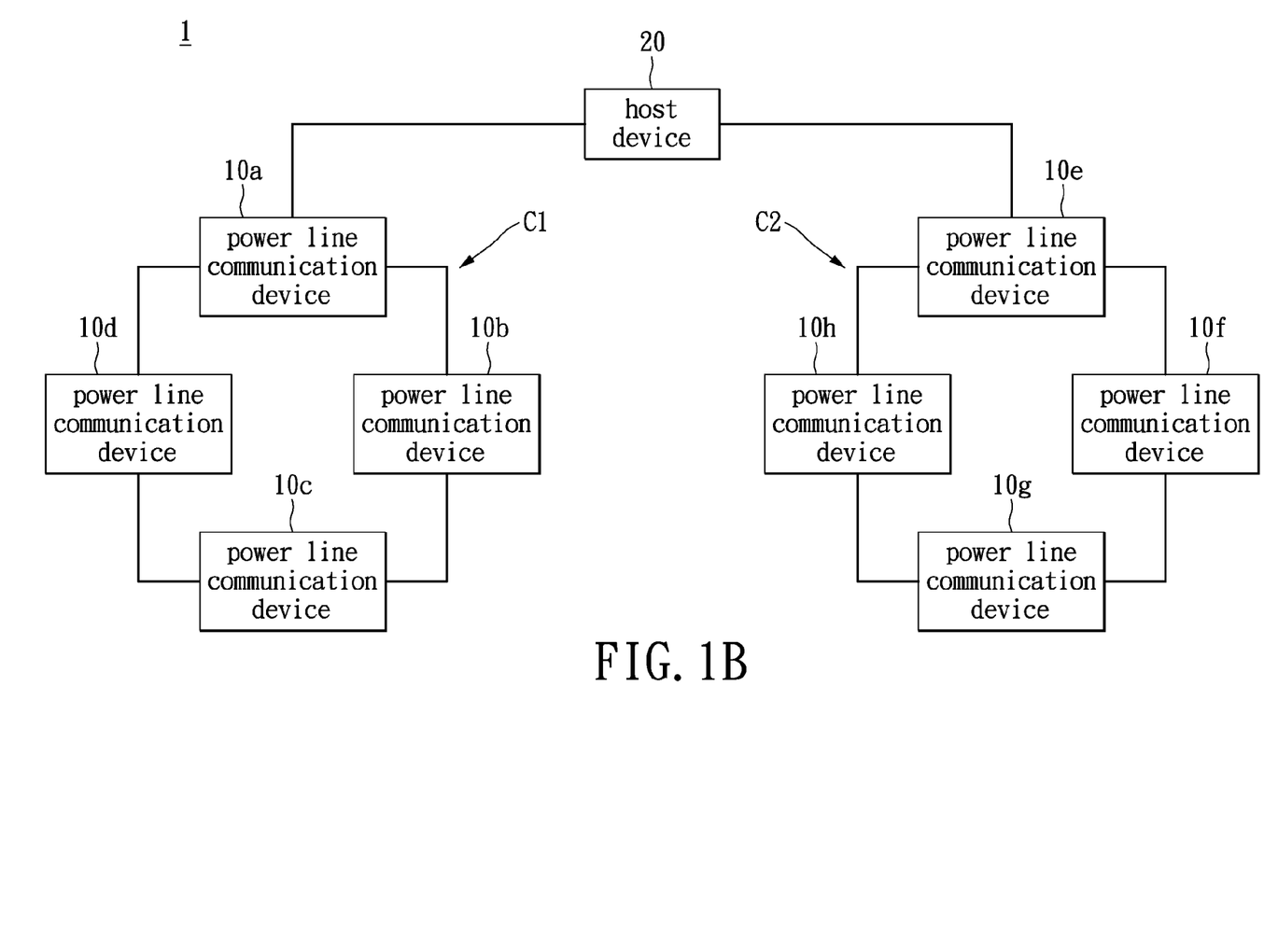
FIG. 1B shows a schematic diagram of a hybrid power line/wireless appliance automation system according to another embodiment of the present invention.

Please refer to FIGS. 1A and 1B. FIG, which respectively illustrate exemplary embodiments of a hybrid power line/wireless appliance automation system in accordance with the instant disclosure. The PLC system 1 primarily comprises plurality of PLC devices 10a-10h and a host device 20. Specifically, some of the PCL devices (e.g. devices 10a-10d) are incorporated in a first electric power distribution circuit C1, while some (e.g. devices 10e-10h) incorporated in a second electric power distribution circuit C2, which is infrastructural-wise independent to the first electric power distribution circuit C1 (that is, distribution circuits C1 and C2 are physically isolated circuits that are independent of each other). Each of the PLC devices 10a-10h are configured to be coupleable to at least one electronic appliance (figures not shown) and provide electrical power thereto. In this embodiment, each of the PLC devices 10a-10h comprises at least one electrical receptacle (not shown in the figures) for receiving electrical plugs of electronic appliances, such as refrigerator, air conditioner, television, or the like (such as electronic device 30 shown in FIG. 2).

The host device 20 is communicatively connected to the PLC devices 10a~10h. The communicative connection between the host device 20 and the PLC devices 10a-10h may be either wired or wireless, depending on operational requirement or practical needs. For example, FIG. 1A shows one exemplary system where the host device 20 respectively establishes communication with at least one PLC device in each of the electric power distribution circuit C1/C2 (e.g. 10a and 10e, respectively) through wireless connection, whereas FIG. 1B shows an alternative embodiment where the host device 20 respectively establishes communication with at least one PLC device in each of the electric power distribution circuits C1/C2 (e.g. 10a and 10e, respectively) through physical/wired connection (such as power line communication). Particularly, if a host device 20 is wiredly connected to the same electric power distribution circuit as a set of PLC devices (e.g. devices 10a-10d in circuit C1), it is sometimes more efficient for the host device 20 and the PLC devices in the same electric power distribution circuit to communication with each other through power line connection. However, the present invention is not limited thereto. Practically, the host device 20 may be a desktop computer, a notebook computer, a server, or the like.

Figure 2:
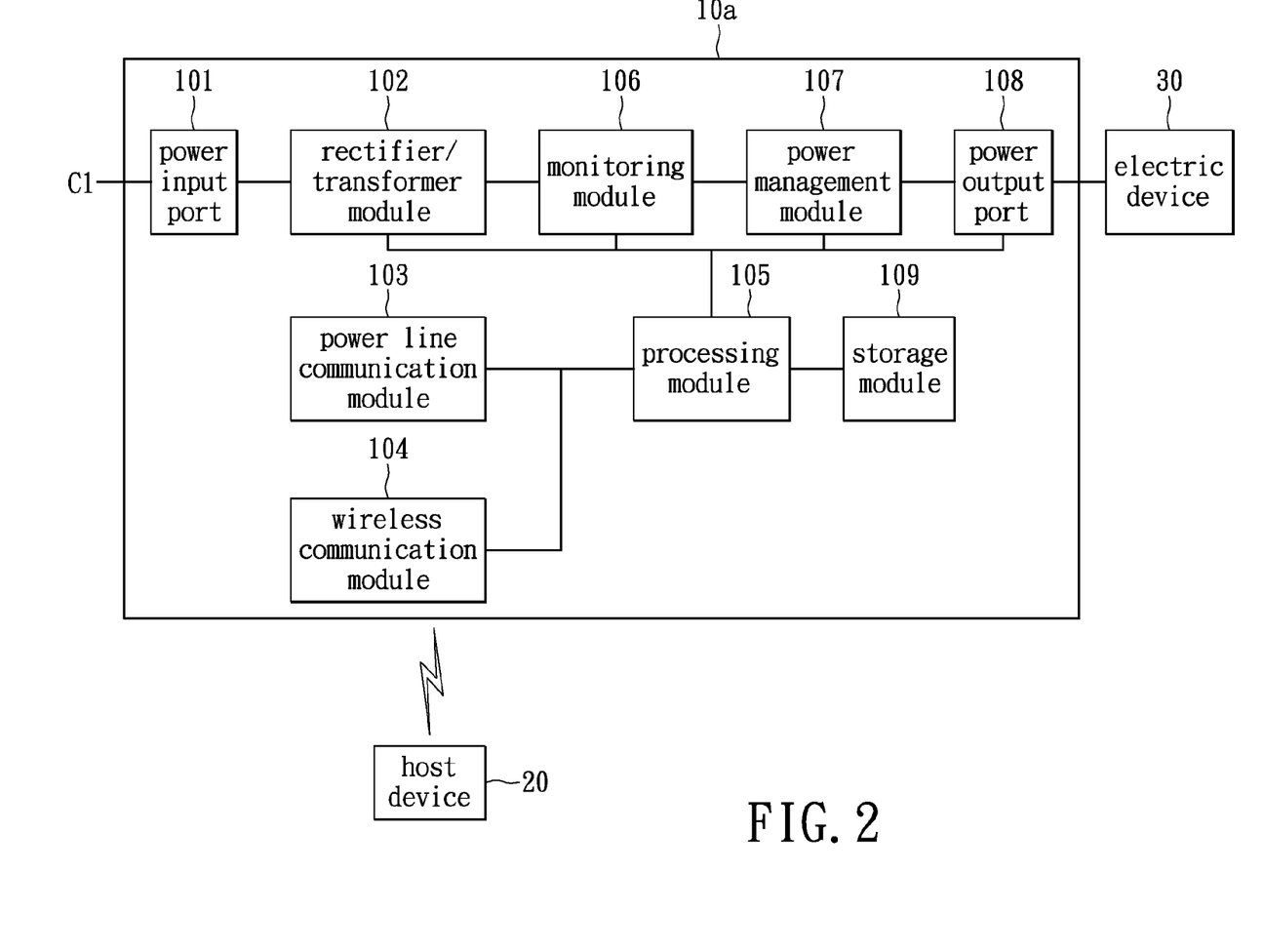
FIG. 2 shows a block diagram of a power line communication device according to an embodiment of the present invention.

Please refer to FIG. 2, which shows a functional block diagram of a PLC device 10a according to one embodiment of the present invention. As shown in FIG. 2, an exemplary PLC device 10a comprises a power input port 101, a rectifier/transformer module 102, a power line communication (PLC) module 103, a wireless communication module 104, a processing module 105, a monitoring module 106, a power management module 107, a power output port 108, and a storage module 109. The processing module 105 is in electrical connection with the PLC module 103, the wireless communication module 104, the monitoring module 106, the power management module 107, and the storage module 109. Furthermore, the PLC module 103 is electrically connected to the power input port 101 and the rectifier/transformer module 102.

The power input port 101 may be an electrical plug having several conductive pins, which are used for receiving electric power from the first electric power distribution circuit C1 as well as power line signals that are modulated in the first electric power distribution circuit C1. The power output port 108 may be an electrical receptacle having several insertion holes, through which electrical power may be supplied to an electronic device 30 plugged thereon. In addition, the number and the specification of the receptacle arranged on the power output port 108 are not limited in the present invention. For example, the power output port 108 of the PLC device (10a) may simultaneously comprise at least one general AC output receptacle for accommodating AC-powered appliances and at least one DC output receptacle (such as a universal serial bus (USB) socket) for accommodating DC-powered devices.

The rectifier/transformer module 102 is mainly used for changing electric current waveform, so as to convert the AC power output from the first electric power distribution circuit C1 into DC power. In addition, the rectifier/transformer module 102 is further capable of changing the amplitude of voltage and/or current. In practice, the rectifier/transformer module 102 may be a rectifier, a converter, a chopper, or a combination circuit thereof.

The power line communication (PLC) module 103 is capable of modulating conventional data signal (wired-transmission data format, e.g., LAN, Internet, etc) into power line signals for transmission over an electric power distribution network (such as the first electric power distribution circuit C1), as well as extracting power line signals transmitted there-through, so as to transmit/receive power line signals to/from the first electric power distribution circuit C1. For example, when the PLC module 103 receives power line signals from the first electric power distribution circuit C1, it demodulates power line signals to conventional data signals. On the other hand, conventional data signals may be modulated by the PLC module 103 into power line signals for transmission over the first electric power distribution circuit C1. Because the PLC technology is well known by those skilled in the art, it will not be described in further detail.

The wireless communication module 104 is used for the interconversion between wire-transmitted data signals and wireless signals. In other words, when the wireless communication module 104 receives wireless signals transmitted from a wireless network, it demodulates wireless signals into data signals. On the other hand, wire-transmitted data signals may be modulated by the wireless communication module 104 into wireless signals for wireless data transmission. Wireless communication protocol applicable in the wireless communication module 104 is not limited in the present invention, and the wireless communication protocol may, for example, be a Bluetooth protocol, a Zigbee protocol, a WiFi protocol, or the protocol of IEEE 802.11 series. Because the wireless communication technology is already known by those skilled in the art, it will not be described in further detail.

The monitoring module 106 is used for detecting and statistically monitoring at least one operational parameter of the PLC device 10a. The operational parameter may be, for example, the power output status of the first electric power distribution circuit C1, the power usage (electricity consumption) of the electronic device 30, the transmission rate of the wireless signal, the transmission rate of the power line communication signal, and/or other environmental factors such as temperature, humidity, and luminance, etc.

The processing module 105 is configured to convert the operational parameter into the format of conventional data signal, and is further capable of determining whether the at least one operational parameter exceeds a threshold value. Specifically, the threshold value is determined in accordance to the data transmission rate between the host device 20 and the PLC device. In practical operation, the data transmission rate of the power line communication network may be negatively affected by the increase of electric current loading in the power lines. Thus, in the event where an operational parameter of the PLC device 10a is determined to exceed the threshold value, the processing module 105 may be configured to generate a control signal in response thereto, which serves as an indication of the need for system self-adjustment (e.g. for controlling/limiting the electric-current loading in the power line network). The processing module 105 may be a micro-controller or a central processing unit (CPU), and is not limited thereto in the present invention.

The power management module 107 receives electrical power conditioned by the rectifier/transformer module 102, and selectively supplies power to the electronic device 30 according to the control signal generated by the processing module 105. Specifically, when the processing module 105 determines that the at least one parameter measured by the monitoring module 106 exceeds the threshold value, the processing module 105 will immediately generate a control signal and transmitted it to the power management module 107. Upon receiving the control signal, the power management module 107 may promptly cut off provision of electricity to the power output port 108, so that the supplying of power to the electronic device 30 is stopped. As a result, the operation of the electronic device 30 may be forcefully terminated. Thus, in the event where the exceeding of the threshold value is detected (which usually indicates the exceeding of certain operational limitation), the safety of the first electric power distribution circuit C1 and the coupled electronic device 30 can still be ensured by the self-monitoring and termination functions provided by the instant disclosure.

In addition, the power management module 107 may be configured to supply voltage of different values to the power output port 108, so as to properly support the voltage requirements of different internal device components and/or externally coupled appliances (e.g. electronic device 30). In other words, the power management module 107 can not only control the on and off of power supply, it can also control the magnitude of the output voltage to support the proper operation of a variety of electronic devices 30 of different specifications. In practice, the power management module 107 may be a relay, a solid state relay (SSR), a thyristor, a power management integrated circuit (PMIC), or the like, which services as a control element (switch) between a power/voltage source and a load for turning on/off the power delivery.

The storage module 109 is capable of storing data/information from other PLC devices 10b-10h via data transmission through the PLC module 103 and the wireless communication module 104 in the PLC device 10a. Specifically, the storage module 109 may store data/information from the other PLC devices 10b-10h, and/or the threshold value and the operational parameter data of the PLC device 10a. In practice, the storage module 109 may be a random access memory (RAM), a read-only memory (ROM) or a flash memory, and is not limited thereto in the present invention.

In order to illustrate the data exchanging operation between the PLC devices 10a-10h in further detail, please concurrently refer to FIG. 1A and FIG. 2. Use PLC device 10a in the first electric power distribution circuit C1 as an example. PLC device 10a may exchange data/information locally with PLC devices 10b-10d within the same electric power distribution circuit (i.e., the first electric power distribution circuit C1 through data signal transmission via the its onboard PLC module 103, and store the obtained data/information in its onboard storage module 109. On the other hand, communication/data exchange with PLC devices 10e-10h in a different electric power distribution circuit (i.e., the second electric power distribution circuit C2) may be accomplished through receiving data signal transmission from the respective wireless communication modules 104 of the remote PLC devices 10e-10h. The obtained data/information may then be stored in the onboard storage module 109 of PLC device 10a.

In practical operation, because the host device 20 is communicatively connected to at least one of the PLC devices 10a-10h, and the PLC devices 10a-10h may be communicatively interconnected through their respective PLC modules 103 and/or the wireless communication modules 104, therefore, the host device 20 may receive power line signal or wireless signal outputted by the PLC devices 10a-10h, thereby enabling the host device 20 to dynamically adjust the threshold value of each PLC device 10a-10h according to the at least one operational parameter of each PLC device 10a-10h.

Accordingly, the threshold value of each PLC device 10a-10h may be suitably modified according to the nature/characteristics of the electronic devices 30 coupled thereon (for example, their respective power consumption levels and frequency of usage) and/or the changes in the ambient environmental condition. For example, if the electronic device 30 coupled to any one of the PLC devices 10a-10h is a refrigerator, the host device 20 may employ a unattainably high threshold value (e.g. setting the threshold value to infinite) on the particular PLC device on which the refrigerator is coupled, so that the power management system 107 is set to transmit non-interrupted supply of electrical power from the power distribution circuit to the refrigerator, so as to prevent the food stored in the refrigerator from spoilage due to power cut-off.

As another example, because the power distribution circuit is generally made of copper with good conductivity, and the resistivity variation of copper with respect to temperature is scaled at an increment of approximately 5 degrees Celsius, when the temperature variation of the power distribution circuit exceeds 5 degrees Celsius, the host device 20 will order all the PLC devices 10a-10h to perform data transmission rate diagnosis of their respective electric power distribution circuit (i.e., the first electric power distribution circuit C1 and the second electric power distribution circuit C2), and respectively transmit the diagnostic result of the data transmission rate back to the host device 20 through power line communication (as shown in FIG. 1B) or wireless communication (as shown in FIG. 1A), so that the host device 20 can perform an operational analysis/evaluation and accordingly determine a new and more appropriate threshold value for each of the PLC devices 10a-10h in accordance to the change of operational environment.

As yet another example, because the PLC devices 10a-10h of the present invention will scheduledly transmit the diagnostic result of the data transmission rate to the host device 20, accordingly, when the host device 20 determines that a large variation occurs in data transmission rate in a power line signal in a particular electric power distribution circuit, the host device 20 may initiate diagnosis on whether the number of PLC devices adopted in the particular electric power distribution circuit has increased or decreased, thereby further fine-tuning the threshold value for each PLC device in the attempt to attain optimized system performance under changing conditions.

Following the above example. If an additional PLC device is added to a particular electric power distribution circuit, it will cause the data transmission rate of the power line signal to drop. To counter this undesirable tendency, the host device 20 may command each of the PLC devices in the electric power distribution circuit to perform a mutual test of data transmission rate, and accordingly dynamically adjust the threshold value of each PLC device. Moreover, in the subsequent period of predetermined duration, the host device 20 may continuously monitor the variation in the data transmission rate of power line signal. If the data transmission rate of power line signal still decreases continuously, it may be an indication that anomaly has occurred in the electric power distribution circuit. The host device 20 may alert a user of such abnormal condition by voice, video or text message. Furthermore, the host device 20 may be configured to automatically (or passively wait for the user to manually) stop the provision of power to all of the electronic devices 30 (or a specific subset thereof) coupled to the electric power distribution circuit through the corresponding PLC devices, until the abnormal situation is resolved.

Figure 3A:
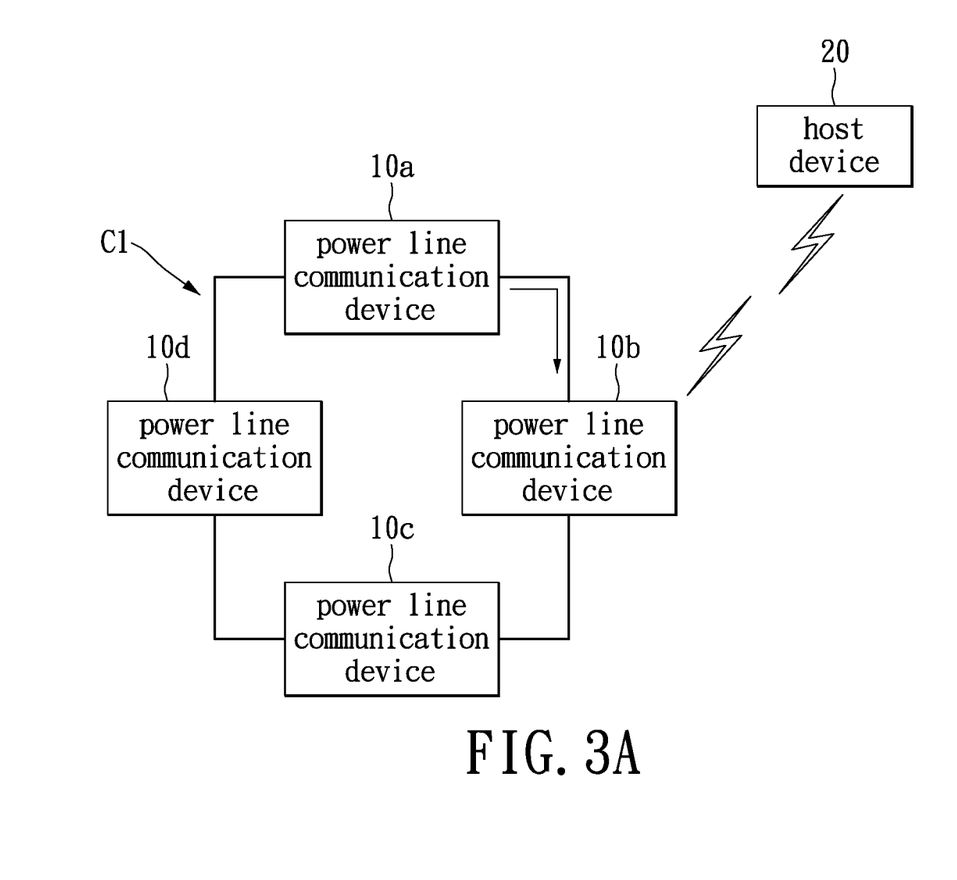
FIG. 3A shows a schematic diagram in real operation of a hybrid power line/wireless appliance automation system according to the present invention.

Please refer to FIG. 3A, which shows a schematic diagram of a PLC system in operation according to the present invention. If, for any reason, the PLC device 10a in the first electric power distribution circuit C1 is unable to establish direct connection with the host device 20 via its onboard PLC module 103 or wireless communication module 104, the PLC device 10a may still establish communication with the host device 20 indirectly through one or more PLC devices 10b (or 10c, 10d) in the same electric power distribution circuit (e.g. the first electric power distribution circuit C1). Specifically, data signals from PLC device 10a may be sent to other PLC devices in the same electric power distribution circuit (e.g., devices 10b-d in the first electric power distribution circuit C1), stored the data/information in their respective storage modules 109, and relayed/forwarded to the host device 20.

Figure 3B:
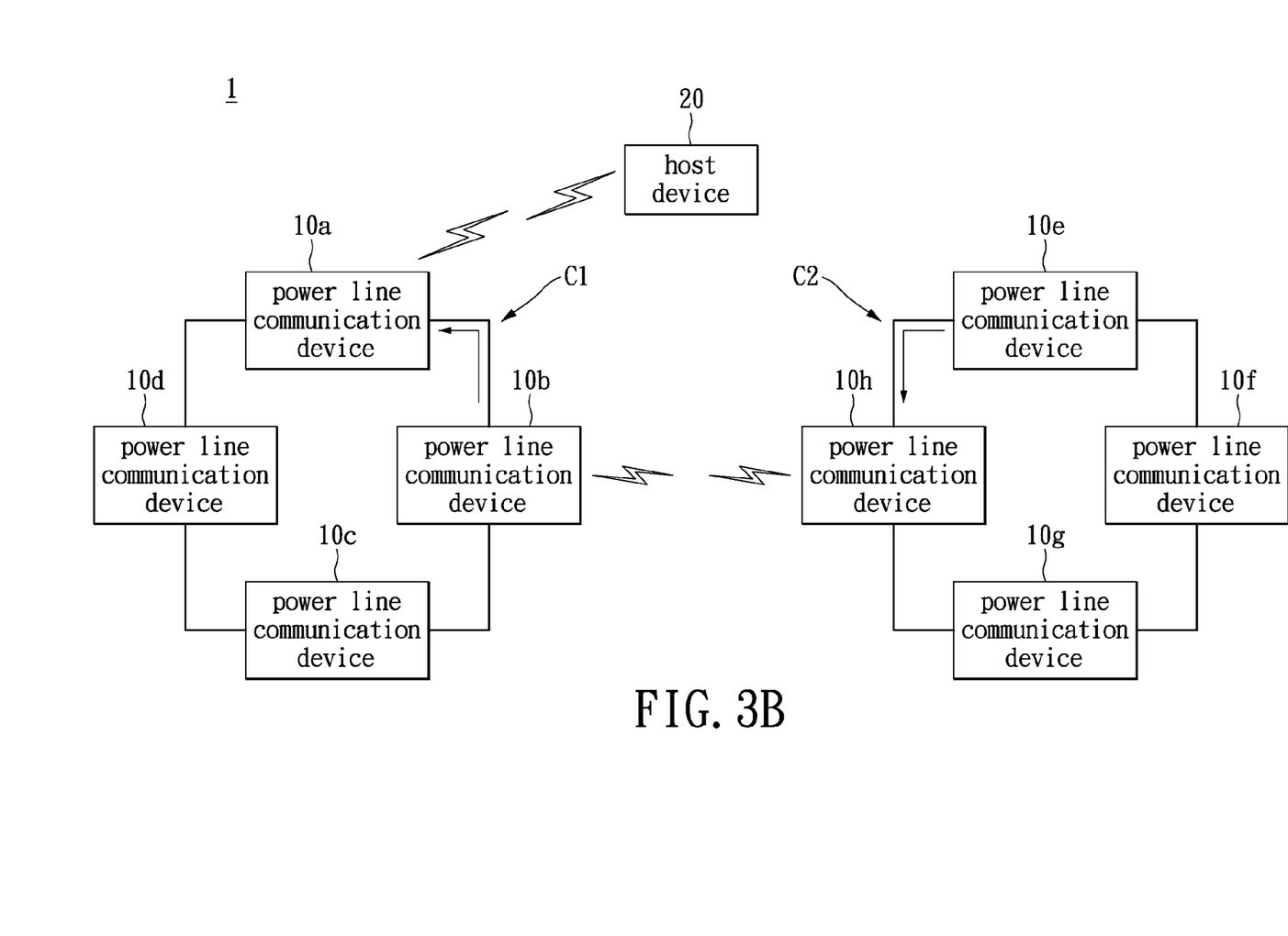
FIG. 3B shows another schematic diagram in real operation of a hybrid power line/wireless appliance automation system according to the present invention.

Please refer to FIG. 3B, which shows another schematic diagram of a PLC system in operation according to the present invention. In the event where PLC device 10e in the second electric power distribution circuit C2 wishes to communicate with host device 20 yet none of the PLC devices 10e-10h cannot establish connection thereto, the PLC device 10e (or any one of PLC devices 10f-10h in the same second electric power distribution circuit C2, in which data signal of the PLC device 10e is stored) may transmit the data signal of the PLC device 10e to any one of the PLC device 10a~10d in the first electric power distribution circuit C1 through wireless means. Subsequently, the data signal originated from the PLC device 10e may be indirectly transmitted to the host device 20 through one of the PLC devices 10a-10d.

In other words, when all the PLC devices 10e-10h from a particular electric power distribution circuit (in this example, the second electric power distribution circuit C2) cannot be communicatively connected to the host device 20, data/information can still be relayed/forwarded to the host device 20 through at least one of the PLC devices 10a-10d in a different electric power distribution circuit (e.g., the first electric power distribution circuit C1).

It is worth noting that each PLC device of the present invention may be provided with a lookup table (LUT). The benefit of implementing lookup table is apparent. For all the PLC devices in an electric power distribution circuit store a data/information indicating a specified PLC device, if the data signal of the specified PLC device is expected to be transmitted, only one PLC device needs to be enabled, so that one of the data signals indicating the specified PLC device can be selected and transmitted. In other words, by utilizing a lookup table in each of the PLC devices 10a-10h, when the data signals to be transmitted by these PLC devices are identical, only one of these PLC devices may be selected to perform transmission. Such a group broadcasting mode can save more energy and provide higher efficiency.

In addition, the PLC system 1 can further include a smart handheld device. Please refer to FIG. 3C, which shows yet another schematic diagram of a PLC system in operation according to the present invention. Specifically, the smart handheld device 40 can be communicatively connected to the plurality of PLC devices 10a-10h to issue operation commands/instructions thereto. When the smart handheld device 40 (for example, smart phone, tablet PC, flat PC, pocket PC, etc.) wishes to issue an operation instruction to one of these PLC devices 10a-10h, the operation instruction may be issued to a specified PLC device by their respective PLC modules 103 or wireless communication modules 104, so that the specified PLC device performs a corresponding operation. In other words, as these PLC devices 10a-10h are further communicatively connected to the smart handheld device 40, by transmitting an operation instruction, the smart handheld device 40 can command these PLC devices 10a-10h to perform an operation corresponding to the operation instruction.

Figure 3C:
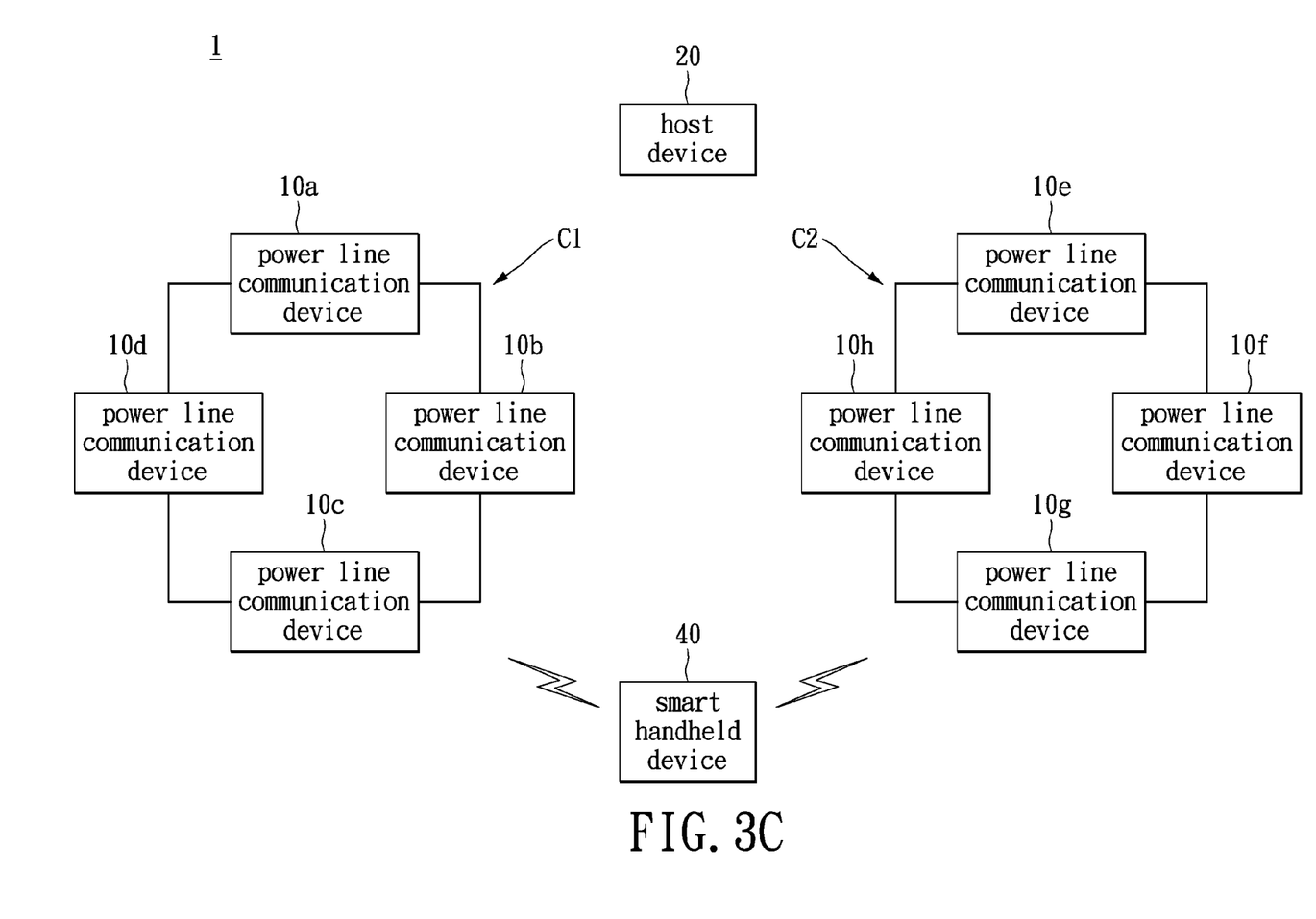
FIG. 3C shows further another schematic diagram in real operation of a hybrid power line/wireless appliance automation system according to the present invention.

The smart handheld device 40 may also be used to access the data/information in each of the PLC devices 10a-10h through the respective wireless communication modules 104. In addition, through suitable design of the storage module 109, the smart handheld device 40 may access the data/information of the all PLC devices in same electric power distribution circuit so long as the smart handheld device 40 is communicatively connected to any one of the PLC devices.

[Embodiment of a Power Monitoring Method of a PLC System]

Figure 4:
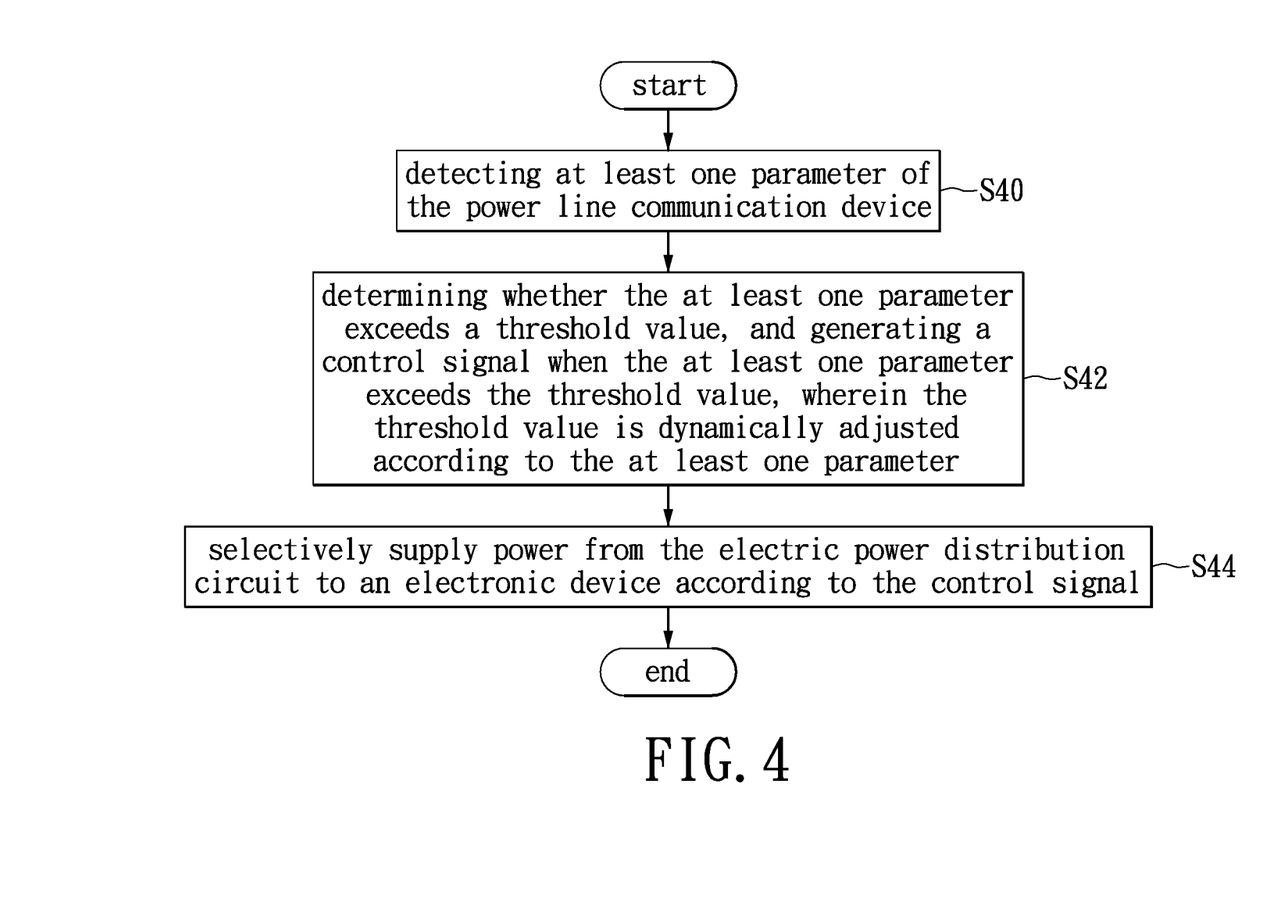
FIG. 4 shows a flow chart in a power monitoring method of the hybrid power line/wireless appliance automation system according to an embodiment of the present invention.

Please refer to FIG. 4, which shows a flow chart in a power monitoring method of a PLC system according to an embodiment of the present invention. The power monitoring method is used in at least one electric power distribution circuit and at least one PLC device incorporated in the at least one electric power distribution circuit is communicatively connected to the host device 20. Specifically, in step S40, the PLC device detects at least one parameter therein.

Next, in step S42, the PLC device determines whether the at least one parameter exceeds a threshold value, and generates a control signal when the at least one parameter exceeds the threshold value, wherein the threshold value is dynamically adjusted by the host device 20 according to the at least one parameter. Finally, in Step S44, the PLC device selectively outputs the power of the electric power distribution circuit according to the control signal. Therefore, the utilization of the PLC system in accordance with the instant disclosure may provide full time monitoring of the electric power distribution circuit.

It is worth noting that a PLC device may obtain data/information from another PLC device through power line communication or a wireless communication and store in the storage module 109. In addition, if one particular PLC device cannot be communicatively connected to the host device 20, another PLC device may instead output the data/information that indicates the particular PLC device to the host device 20.

Summing up the above, a PLC device, a hybrid power line/wireless appliance automation system, and a power monitoring method utilizing the same are provided in the present invention, wherein the PLC devices arranged in different electric power distribution circuits can be communicatively connected mutually by wireless communication modules in the PLC devices to provide wide data transmission/communication coverage within/across physically isolated electric power distribution circuits. In addition, if the PLC devices located at dead zones of a wireless network in an electric power distribution circuit can be communicatively connected and also connected with the host device by the power line communication modules in the PLC devices, and the host device can dynamically adjust the threshold value of each PLC device by analyzing at least one parameter in its PLC device. The PLC device may determine whether to supply continuously or turn off power to an electronic device coupled to the PLC device according to the threshold value that is dynamically adjusted in accordance with the variation of the parameter. Thus, the PLC device, the hybrid power line/wireless appliance automation system, and the power monitoring method utilizing the same as provided by the present invention may easily be combined with existing household network, and it is not necessary to install physical network lines. Furthermore, the present invention has a function of monitoring an electric power distribution circuit and is quite suitable to be applied in an intelligent home management system.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A hybrid power line/wireless appliance automation system for interfacing between at least one electric power distribution circuit and at least one electronic device to enable management of the at least one electronic device, including:

a plurality of power line communication devices adapted in the at least one electric power distribution circuit, each power line communication device capable of interfacing the at least one electronic device and comprising:

a power line communication module capable of interconversion between data signal and power line signal, adapted to selectively receive and transmit power line signal through the at least one electric power distribution circuit, a wireless communication module capable of interconversion between data signal and wireless signal, adapted to selectively receive and transmit wireless signal, a monitoring module for detecting at least one operational parameter of the power line communication device, a processing module in electrical connection with the power line communication module, the wireless communication module, and the monitoring module, capable of converting the at least one parameter to the data signal and determining whether the at least one parameter exceeds a threshold value, configured to generate a control signal when the at least one parameter exceeds the threshold value, a power management module in electrical connection with the processing module, adapted to receive electrical power from the at least one electric power distribution circuit and selectively supply power to the at least one electronic device according to the control signal; and a host device communicatively coupled to at least one of the plurality of power line communication devices, configured to dynamically adjust the threshold value for each of the power line communication devices according to the at least one operational parameter thereof by receiving the power line signal or the wireless signal transmitted there-from.

2. The hybrid power line/wireless appliance automation system according to claim 1, wherein the power line communication device further includes a storage module electrically connected to the processing module, adapted to store data/information from other power line communication devices selectively via transmission through the onboard power line communication module and the wireless communication module of the power line communication device.

3. The hybrid power line/wireless appliance automation system according to claim 2, wherein when one of the plurality of power line communication devices in the at least one electric power distribution circuit is unable to establish direct connection with the host device, the power line communication device establishes communication with the host device indirectly through one or more other power line communication devices in the same electric power distribution circuit.

4. The hybrid power line/wireless appliance automation system according to claim 2, wherein the at least one electric power distribution circuit includes a first electric power distribution circuit and a second electric power distribution circuit, wherein when all the power line communication devices in the first electric power distribution circuit cannot establish connection with the host device, the power line communication devices in the first electric power distribution circuit transmit the data signal thereof wirelessly via the onboard wireless communication module thereof to at least one of the power line communication devices in the second electric power distribution circuit, wherein at least one of the power line communication devices in the second electric power distribution circuit outputs the data signal indicating the existence of each power line communication device in the first electric power distribution circuit to the host device by the onboard storage module thereof.

5. The hybrid power line/wireless appliance automation system according to claim 1, wherein the at least one parameter includes at least one of: transmission rate of the power line signal, power usage of the at least one electronic device, transmission rate of the wireless signal, power output status, temperature, humidity, and luminance.

6. The hybrid power line/wireless appliance automation system according to claim 1, further including a smart handheld device, which is communicatively connected to the power line communication devices, so as to transmit an operation instruction to the power line communication devices, when the smart handheld device desires to transmit the operation instruction to one of the power line communication devices, the operation instruction is transmitted to a specified power line communication device by the power line communication module or the wireless communication module.

7. The hybrid power line/wireless appliance automation system according to claim 1, wherein the power line communication device further comprises a power input port and a rectifier/transformer module electrically connected to the power line communication module, a power output port electrically connected to the power management module.

8. A power line communication device communicatively couple-able to a host device, utilized in a hybrid power line/wireless appliance automation system for interfacing between at least one electric power distribution circuit and at least one electronic device, the power line communication device comprising:
   a power line communication module capable of interconversion between data signal and power line signal, adapted to selectively receive and transmit power line signal through the at least one electric power distribution circuit;
   a wireless communication module capable of interconversion between data signal and wireless signal, adapted to selectively receive and transmit wireless signal;
   a monitoring module for detecting at least one operational parameter of the power line communication device;
   a processing module in electrical connection with the power line communication module, the wireless communication module, and the monitoring module, capable of converting the at least one parameter to the data signal and determining whether the at least one parameter exceeds a threshold value, configured to generate a control signal when the at least one parameter exceeds the threshold value; and
   a power management module in electrical connection with the processing module, adapted to receive electrical power from the at least one electric power distribution circuit and selectively supply power to the at least one electronic device according to the control signal.

9. The power line communication device according to claim 8, wherein the threshold value of the power line communication device is dynamically adjustable by the host device selectively through wired and wireless connections.

10. The power line communication device according to claim 8, further comprising a power input port and a rectifier/transformer module electrically connected to the power line communication module, a power output port electrically connected to the power management module.

11. The power line communication device according to claim 8, further including a storage module, which is electrically connected with the processing module, adapted to store data/ information from other power line communication device via transmission through the onboard power line communication module and the wireless communication module of the power line communication device.

12. The power line communication device according to claim 11, wherein when the other power line communication device cannot be communicatively connected to the host device, the power line communication device in the at least one electric power distribution circuit outputs the data signal indicating the existence of the other power line communication device to the host device by the onboard storage module thereof.

13. The power line communication device according to claim 8, wherein the at least one parameter includes at least one of: transmission rate of the power line signal, transmission rate of the wireless signal, power output status, temperature, humidity, and luminance.

14. The power line communication device according to claim 8, wherein the power line communication device is further communicatively connected to a smart handheld device, and by transmitting an operation instruction of the smart handheld device lets the power line communication device perform an operation corresponding to the operation instruction.

15. A power monitoring method utilizing a hybrid power line/wireless appliance automation system, which comprises a host device communicatively coupled to at least one power line communication device according to claim 8, each power line communication device adapted in at least one electric power distribution circuit and interfacing at least one electronic device, the method comprising:
   detecting at least one parameter of the at least one power line communication device by an onboard monitoring module thereof;
   determining whether the at least one parameter exceeds a threshold value by an onboard processing module of the power line communication device, and when the at least one parameter exceeds the threshold value, a control signal is generated by the processing module; and
   selectively supplying power from the at least one electric power distribution circuit to the at least one electronic device by an onboard power management module of the power line communication device according to the control signal;
   wherein, the host device configured to dynamically adjust the threshold value for each of the power line communication devices according to the at least one parameter.

16. The power monitoring method according to claim 15, wherein the threshold value is dynamically adjusted by the host device according to the at least one parameter.

17. The power monitoring method according to claim 15, wherein the at least one power line communication device is communicatively connectable to the other power line communication device selectively through wired and wireless connections, and stores the data/information of the other power line communication device by an onboard storage module thereof.

18. The power monitoring method according to claim 17, wherein when the other power line communication device cannot be communicatively connected to the host device, the at least one power line communication device in the at least one electric power distribution circuit outputs the data signal indicating the existence of the other power line communication device to the host device.

19. The power monitoring method according to claim 15, wherein the at least one parameter includes at least one of: transmission rate of a power line signal, transmission rate of a wireless signal, power usage of the at least one electronic device, power output status, temperature, humidity, and luminance.

\* \* \* \* \*